US 9,112,807 B2

(12) United States Patent
Llorca et al.

(10) Patent No.: US 9,112,807 B2
(45) Date of Patent: Aug. 18, 2015

(54) SYSTEM AND METHOD FOR MANAGING NETWORK INFORMATION

(71) Applicant: Alcatel-Lucent USA Inc., Murray Hill, NJ (US)

(72) Inventors: Jaime Llorca, Red Bank, NJ (US); Antonia Tulino, Lincroft, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 230 days.

(21) Appl. No.: 13/726,896

(22) Filed: Dec. 26, 2012

(65) Prior Publication Data

US 2014/0181282 A1   Jun. 26, 2014

(51) Int. Cl.
*H04L 12/24* (2006.01)
*H04L 29/08* (2006.01)

(52) U.S. Cl.
CPC ............ *H04L 41/50* (2013.01); *H04L 67/1097* (2013.01); *H04L 67/2852* (2013.01); *Y02B 60/50* (2013.01)

(58) Field of Classification Search
CPC . H04L 41/50; H04L 67/1097; H04L 67/2852; Y02B 60/50
USPC ......................................... 709/223, 224–226
See application file for complete search history.

(56) References Cited

U.S. PATENT DOCUMENTS

| 6,405,240 B1 | 6/2002 | Tsubone et al. | |
| 6,944,594 B2 * | 9/2005 | Busayapongchai et al. | .. 704/275 |
| 2003/0126232 A1 | 7/2003 | Mogul et al. | |
| 2008/0316048 A1 * | 12/2008 | Abdallah | ................... 340/854.6 |
| 2009/0077396 A1 * | 3/2009 | Tsai et al. | ..................... 713/310 |
| 2010/0177648 A1 * | 7/2010 | Diab | ............................. 370/252 |
| 2013/0121157 A1 * | 5/2013 | Logvinov et al. | ............. 370/238 |

OTHER PUBLICATIONS

International Search Report (PCT/ISA/210) mailed May 9, 2014 for corresponding International Application No. PCT/US2013/075250.
Written Opinion of the International Searching Authority (PCT/ISA/227) mailed May 9, 2014 for corresponding International Application No. PCT/US2013/075250.
Kilper et al., "Power Trends in Communication Networks," *IEEE Journal on Sel. Top. in Quantum Electronics*, vol. 17, No. 2, pp. 275-284, 2011.
Jacobson et al., "Networking Named Content," *CoNEXT'09*, Rome, Italy, Dec. 2009.
Lee et al., "Toward Energy-Efficient Content Dissemination" *IEEE Network*, vol. 25, No. 2, pp. 14-19, Mar. 2011.
Cuevas et al., "Deep Diving into BitTorrent Locality", *INFOCOM'11*, Shangai, Feb. 2011.
Vixie. "What dns is not", *Communications of the ACM*, vol. 52, No. 12, pp. 43-47. Dec. 2009.

(Continued)

*Primary Examiner* — Jude Jean Gilles
(74) *Attorney, Agent, or Firm* — Harness, Dickey & Pierce, P.L.C.

(57) ABSTRACT

A method for managing information in a network includes identifying a first network entity storing a requested object, receiving the object from the first network entity, and storing the object in a storage area based on a parameter. The storage area is coupled to a second network entity which received the request and the object from the first network entity, and the parameter is indicative of an amount of energy for the second network entity to receive the object from the first network entity.

20 Claims, 6 Drawing Sheets

(56) References Cited

OTHER PUBLICATIONS

Guan et al., "On the Energy Efficiency of Content Delivery Architectures," *IEEE ICC Green Communications (GreenComm) Workshop*, Kyoto, Japan, Jun. 2011.
Choi et al., "In-Network Caching Effect on Optimal Energy Consumption in Content-Centric Networking," *ICC'12*, Ottawa, Jun. 2012.
Ghodsi et al., "Information-Centric Networking: Seeing the Forest for the Trees", *HotNets'11, Cambridge*, MA, Nov. 2011.
Krishnan et al., "The cache location problem," *IEEE/ACM Trans. on Networking*, vol. 8, No. 5, pp. 568-582, 2000.
Qiu et al., "On the placement of web server replicas," *IEEE INFOCOM 2001 Proceedings*, vol. 3, 2001.
Borst et al., "Distributed Caching Algorithms for Content Distribution Networks," *INFOCOM'10*, San Diego, Mar. 2010.
Applegate et al., "Optimal Content Placement for a Large-Scale VoD System," *CoNEXT'10*, Nov. 2010.
Kalpakis et al., "Optimal placement of replicas in trees with read, write, and storage costs," *IEEE Transactions on Parallel and Distributed Systems*, vol. 12, No. 6, pp. 628-637, 2001.
Baev et al., "Approximation algorithms for data placement problems," *SIAM J. Comput* vol. 38, pp. 1411-1429, 2008.
Psaras et al., "Modelling and Evaluation of CCN-Caching Trees", *Networking'11*, Valencia, Spain, Apr. 2011.
Rossi et al., "On sizing CCN content stores by exploiting topological information", *NOMEN'12*, Orlando, FL, Apr. 2011.
Chen et al., "Intra-cloud Lightning: Building CDNs in the Cloud", *INFOCOM'12*, Orlando, Mar. 2012.
Bahn et al., "Efficient Replacement of Nonuniform Objects in Web Caches", *IEEE*, 2002.
Psaras et al., "Probabilistic In-Network Caching for Information-Centric Networks", *ACM SIGCOMM ICN Workshop*, 2012.

\* cited by examiner

SYSTEM AND METHOD FOR MANAGING NETWORK INFORMATION

BACKGROUND OF THE INVENTION

One or more embodiments relate to managing network information.

Communication networks continue to evolve to meet consumer demand for faster and more efficient dissemination of information including multimedia data. While several solutions have been proposed for increasing the throughput and efficiency (e.g., cost/bit delivered) of data dissemination on various communication networks, improvements are still required.

SUMMARY OF THE INVENTION

In accordance with one embodiment, a method for managing information in a network includes identifying a first network entity storing an object, receiving the object from the first network entity, and storing the object in a storage area based on a parameter. The storage area is coupled to a second network entity which received a request for the object and the object from the first network entity, and the parameter is indicative of an amount of energy for the second network entity to receive the object from the first network entity. The first network entity may or may not be a user terminal.

The amount of energy for the second network entity to receive the object from the first network entity may be based on at least a separation value between the first network entity and the second network entity. The separation value may be based on at least one of a path length between the first and second network entities (which, for example, may be based on a number of network nodes between the first and the second network entities), a transport energy efficiency of a network path between the first network entity and the second network entity, a transport capacity of the network path between the first and the second network entities, a load of the network path between the first and the second network entities, or a transfer time or rate between the first and second network entities. In another embodiment, the amount of energy may be determined based on a combination of the aforementioned considerations.

The storing operation may include determining an amount of energy to store the object in the storage area, comparing the amount of energy to store the object in the storage area and the amount of energy for the second network entity to receive the object from the first network entity, and storing the object in the storage area based on the comparison.

The object may be stored in the storage area when the amount of energy to store the object in the storage area for a time period (e.g., a time period is associated with the next request arrival time) is less than the amount of energy or the second entity to receive the object from the first network entity. The object may not be stored in the storage area when the amount of energy to store the object in the storage area for a time period is greater than the amount of energy for the second entity to receive the object from the first network entity.

The amount of energy for the second network entity to store an object during a time period may be determined based on the energy efficiency of the storage equipment, the size of the object, and/or the time period duration. The time period duration is computed as the difference between the object arrival time and the next request arrival time.

The method may further include storing information including a first list of objects in the storage area, a second list of requests for objects received by the second network entity, information of a network condition between the first and second network entities, and information of the frequency/rate at which object requests are received by the second entity. Node u may update at least one of the first list and the network condition when a new object arrives from the first entity, and at least one of the second list and the request rate information when another request for the object is received. The information may be stored in an area accessible by the second network entity.

The network condition information may be indicative of, for example, a path length between the first and second network entities (e.g., which may be based on a number of network nodes between the first and the second network entities), a transport energy efficiency of a network path between the first network entity and the second network entity, a transport capacity of the network path between the first network entity and the second network entity, a load of the network path between the first network entity and the second network entity, and/or a transfer time or rate between the first and second network entities.

A load of the network path between the first and second network entities and/or a transfer rate or time between the first and second network entities may be updated based on a predictor. The predicator may be based on an estimated average load or transfer time or rate between the first and second entities.

Analogously, the object request rates may be updated based on a predictor. The predictor may be based on an estimated average rate at which requests for a given object arrive at the second entity. The estimated average load and average request rates can be computed based on information received with the actual objects and requests, thus incurring negligible overhead.

The method may further include transmitting the object to another network entity which sent the request to the second network entity. The other network entity may be one that initiated the request or may be a user terminal. Also, the other network entity may be different from a network entity that initiated the request.

In accordance with another embodiment, an apparatus includes first logic to identify a first network entity having an object, an interface to receive the object from the first network entity, and second logic to store the object in a storage area based on a parameter. The storage area may be coupled to a second network entity and the parameter may be indicative of an amount of energy for the second network entity to receive the object from the first network entity.

The second logic may determine an amount of energy to store the object in the storage area, compare the amount of energy to store the object in the storage area and the amount of energy for the second network entity to receive the object from the first network entity, and store the object in the storage area based on the comparison.

The second logic may also store the object in the storage area when the amount of energy to store the object in the storage area for a time period is less than the amount of energy for the second entity to receive the object from the first network entity. The second logic may not store the object in the storage area when the amount of energy to store the object in the storage area for a time period is greater than the amount of energy for the second entity to receive the object from the first network entity.

A third logic may update at least one of the first list, the second list, or the network condition information when a request for the object is received or a new object is received.

The storage area may be configured to store a first list of objects stored in the storage area, a second list of requests for objects received by the second network entity, and information indicative of a network condition between the first and second network entities, and information of a network condition based on the rate at which object requests arrive at the second entity.

In accordance with another embodiment, a non-transitory computer-readable medium stores instructions for managing information in a network. The instructions include first code to identify a first network entity having an object, second code to receive the object from the first network entity, and third code to store the object in a storage area based on a parameter. The storage area is coupled to a second network entity which received a request for the object and the object from the first network entity, and the parameter may be indicative of an amount of energy for the second network entity to receive the object from the first network entity.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention.

DETAILED DESCRIPTION OF THE EMBODIMENTS

Various example embodiments will now be described more fully with reference to the accompanying drawings in which some example embodiments are shown.

While example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all tennis (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms of algorithms performed by a controller. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements, existing end-user devices and/or post-processing tools (e.g., mobile devices, laptop computers, desktop computers, etc.). Such existing hardware may include one or more Central Processing Units (CPUs), digital signal processors (DSPs), application-specific-integrated-circuits, field programmable gate arrays (FPGAs) computers or the like.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

Note also that the software implemented aspects of example embodiments are typically encoded on some form of tangible (or recording) storage medium or implemented over some type of transmission medium. As disclosed herein, the term "storage medium" may represent one or more devices for storing data, including read only memory (ROM), random access memory (RAM), magnetic RAM, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code or code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "terminal" may be synonymous to a mobile user, mobile station, mobile terminal, user, subscriber, wireless terminal, user equipment and/or remote station and may describe a remote user of wireless resources in a wireless communication network. Accordingly, terminal may be a wireless phone, wireless equipped laptop, wireless equipped appliance, etc.

The term "base station" may be understood as a one or more cell sites, base stations, nodeBs, enhanced NodeBs, access points, and/or any terminus of radio frequency communication. Although current network architectures may consider a distinction between mobile/user devices and access points/cell sites, the example embodiments described hereafter may generally be applicable to architectures where that distinction is not so clear, such as ad hoc and/or mesh network architectures, for example.

Communication from the base station to the terminal is typically called downlink or forward link communication. Communication from the terminal to the base station is typically called uplink or reverse link communication.

Figure 1:
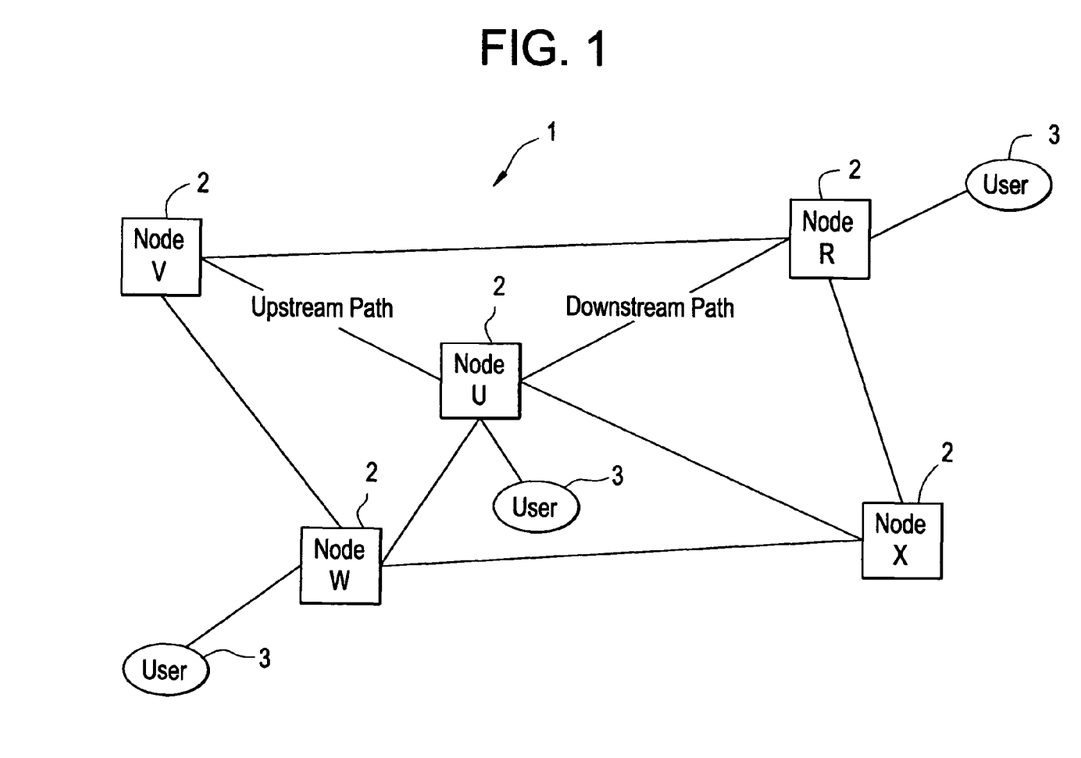
FIG. 1 shows an example of a communications network.

FIG. 1 shows a network 1 for transferring information among a plurality of users. The network may be any type of wired or wireless network or a combination of the two. Examples include the Internet, cable television networks, mobile communication networks, and satellite networks. While some embodiments are applicable to wider area networks, other embodiments may implemented in or with various shorter-range networks including Worldwide Interoperability for Microwave Access (WiMAX), Wireless Fidelity (Wi-Fi) and Bluetooth.

In network 1, a plurality of network entities are shown. The network entities may be routers, servers, hubs, switches, network controllers, bridges, repeaters, cloud-connected devices, and/or various types of network-attached devices for caching or otherwise storing information on the network. When the network corresponds to or includes a mobile network, the nodes may include a base station, a gateway (GPRS) support node, a serving GPRS support node, a home location register, and a visitor location register. (The acronym GPRS stands for General Packet Radio Service). For brevity, these network entities are generally referred to as nodes 2.

At least some of the nodes (e.g., Nodes R, W, and U) in network 1 are directly connected to user terminals 3, while other nodes are not connected directly to user terminals but rather perform the function of storing and/or exchanging information with other nodes. The user terminals cellular phones, smart devices, internet terminals, workstations, user equipment (UE), pad- or pod-type devices, computers, or other types of user devices adapted for network connection.

Accordingly, the network may be used to transfer information including voice calls, documents, text messages, email, television signals, navigation data, video, applications, images, webpages, and/or other types of multimedia information. One exemplary embodiment described in greater detail below transmits multimedia data over the Internet between and among a plurality of users at a faster rate and with greater efficiency that legacy networks.

Figure 2:
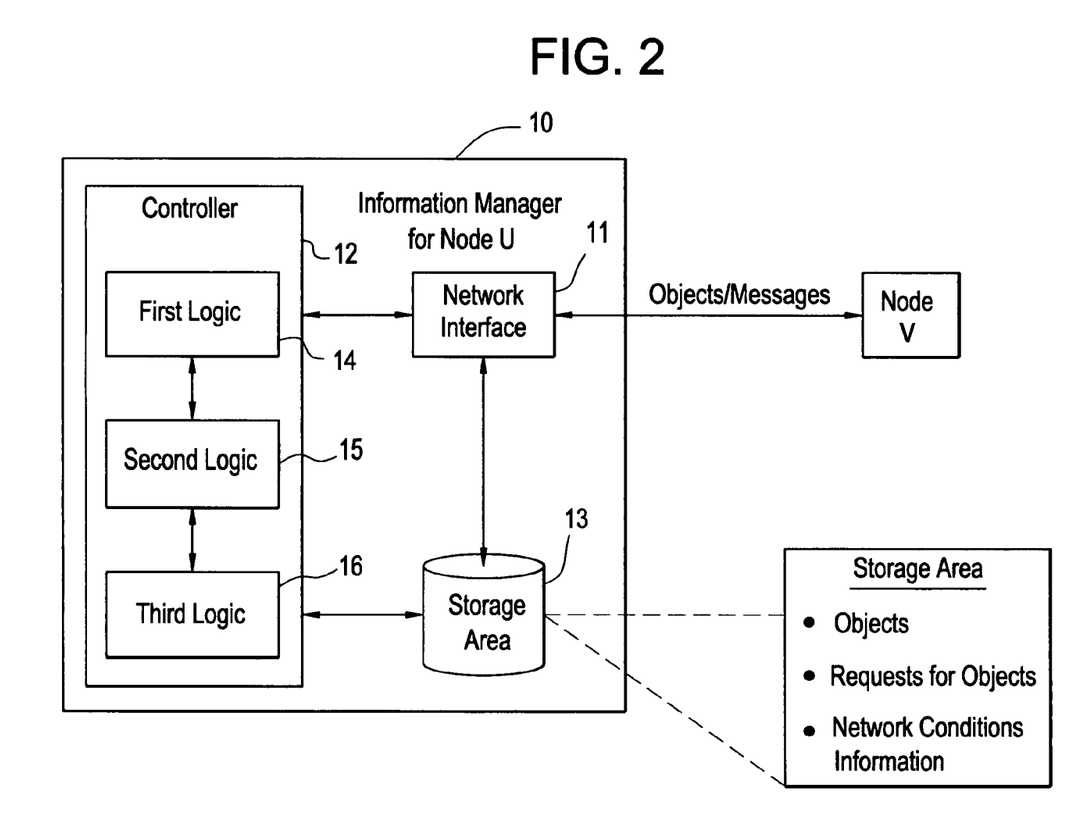
FIG. 2 shows one embodiment of a node information manager.

FIG. 2 shows one embodiment of an information manager 10 for one of the nodes in the network. The information manager is shown for Node u, but may be used to manage information for any of the other nodes. In this embodiment, the information manager includes a network interface 11, a controller 12, and a storage area 13. The network interface may control the transfer of information and control signals between Node u and one or more of the other nodes and/or directly to a user terminal. For illustrative purposes, the network interface is shown to control the exchange of signals with Node v.

The controller 12 performs management functions for the node including controlling the storage of information received from other nodes in the network. In this embodiment, the controller 12 includes first logic 14, second logic 15, and third logic 16. These logic elements may be implemented in the form of hardware (e.g., a processor chip, application-specific integrated circuit (ASIC), or other hard-wired circuit), software (e.g., firmware, middleware, or another set of instructions), or a combination of hardware or software.

The first logic 14 performs operations which include identifying a first network entity having an object. The first network entity may be, for example, Node v storing an object in the form of a number of packets (or bits) of a video stream which has been requested by a user. The first logic may determine that Node v has access to the object (e.g., stores or otherwise is able to transfer the object to Node u) based on information contained in a packet transferred from Node v. In one embodiment, Node v may be an object itself. While a video stream is indicated to correspond to the object in this embodiment, the object may by any of the aforementioned types of information in other embodiments.

For example, when Node u receives a request for an object from another node (or from a user terminal), the controller 12 of Node u may transmit a message to other nodes in the network (which, for example, may be one or more local nodes, e.g., ones within a certain path distance from Node u) to determine whether any of those nodes store or otherwise have access to the requested object. At least one of these nodes (or user terminals) that have access to the object may respond to Node u with a reply message or the object itself.

Additionally, or alternatively, Node v may transmit messages to notify Node u (and possibly one or more other nodes) of the objects it is storing or to which it otherwise has access. Node u may then store information in these messages (e.g., at least for a set period of time) in order to allow those objects to be received from Node v when requested. Information identifying stored objects may be included, for example, in a field in the header of a packet sent to Node u.

The second logic 15 performs operations which include storing objects received through the network interface in storage area 13. In accordance with one embodiment, the second logic 15 selectively stores received objects in storage area 13 based on one or more parameters (or conditions).

One parameter is indicative of an amount of energy for the second network entity to receive the object from the first network entity. This amount of energy may be determined in various ways. For example, the amount of energy for Node u to receive an object from Node v may be based on at least one of a path length between the Nodes u and v, a transport energy efficiency of a network path between the these two nodes, a transport capacity of the network path between these nodes, a load of the network path within a zone that includes nodes u and v or specifically between these nodes, and/or a transfer time or rate between these nodes.

While Nodes u and v are shown as being directly coupled to one another, one or more intervening nodes may be included between nodes u and v in other embodiments. In another embodiment, the amount of energy may be determined based on a combination of the aforementioned considerations.

The second logic 15 may perform a number of additional operations in determining whether to store an object in storage area 13. In accordance with one embodiment, the second logic 15 may determine an amount of energy to store the object in storage area 13, compare the amount of energy to store the object in storage area 13 and the amount of energy for the Node u to receive the object from Node v, and then store the object in the storage area based on the comparison.

One or more techniques for computing or otherwise determining the energy required to store an object during a period of time may be determined in a variety of ways. One way involves determining the energy based on cost efficiency of the storage equipment $e\^{}st$ (in Watts/bit), the size of the object B (in bits) and/or the time duration T as: Energy_storage=$e\^{}st*B*T$. Other computational techniques for determining energy are discussed in greater detail below.

For example, the second logic 15 may store the object received from Node v in storage area 13 when the amount of energy to store the object in this area for a time period is less than the amount of energy for the second entity to receive the object from the first network entity. The time period may be programmed or otherwise set by the controller 12 and/or may be based on an estimate of the next object-request arrival time. Conversely, the second logic 15 may not store the object in the storage area when the amount of energy to store the object in the storage area for a time period is greater than the amount of energy for the second entity to receive the object from the first network entity.

The storage area 13 may be a cache, memory, database, or storage appliance in or locally attached to the controller of Node u. Alternatively, the storage area may be at a remote location relative to Node u and coupled to controller 12 by an appropriate interface. In this latter case, the interface may be included in a storage area network.

The storage area may store various types of information. For example, as shown in FIG. 2, the storage area may store a first list of objects stored at Node u (which, for example, may be at another location in storage area 13 or may be a remote storage area coupled to controller 12), a second list of requests for objects received by Node u (for example, from one or more user terminals or other nodes), and information indicative of one or more network conditions between Nodes u and v or an area of the network that includes these nodes, and information about the rate at which the objects in the lists are requested at node u.

The third logic 16 performs operations which include updating at least one of the first list, second list, or network condition information in storage area 13 when a request for the object is received. The network condition information may be indicative of a transfer rate or time between Nodes u and v and the transfer rate or time may be updated based on a predictor. In one embodiment, the predictor may be based on an estimated average transfer time or rate between the nodes computed, for example, based on current traffic, load, and/or capacity conditions. For the network condition associated to the request rates at node u, a predictor may use the average inter arrival time of requests for the given object at Node u.

Figure 3:
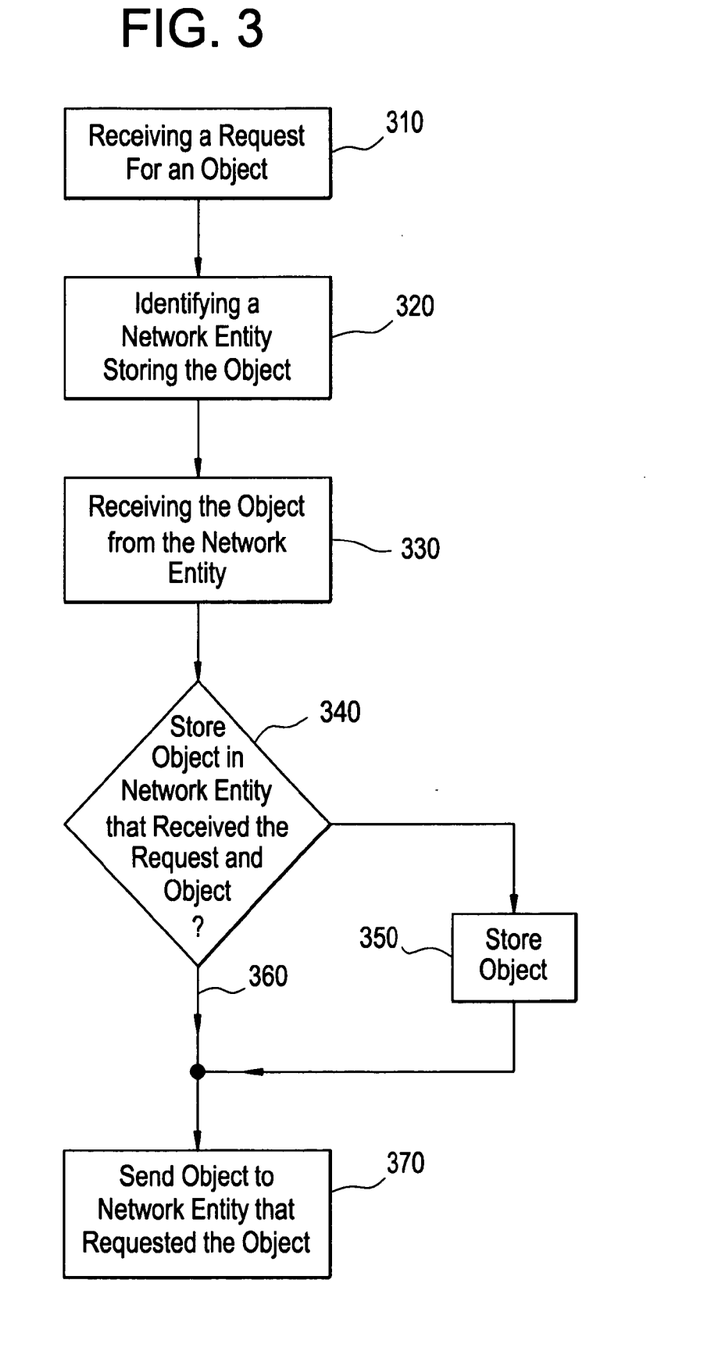
FIG. 3 shows a method for managing network information.

FIG. 3 shows operations included in one embodiment of a method for managing information in a network. These operations may be performed by the information manager in FIG. 2 or another processing system. For convenience, reference will be made to the information manager in FIG. 2.

An initial operation includes receiving a request for an object. (Block 310). The request may be received from another node in the network (e.g., Node r) or from a user terminal. If received from another node, the node itself may be coupled to a user terminal and the request may be sent through a path, which, for example, may be determined based on path distance, capacity, or load conditions. As a non-limiting example, Equation (1) of the Example Embodiment discussed below provides an indication of a rate at which requests may be received at a node.

Once the request has been received, the first logic 14 of controller 12 may identify a network entity from which the object may be accessed. (Block 320). This entity may be another node which is currently transferring the object to still another node (e.g., Node w) or a user terminal. In this case, the object (which may comprise a plurality of packets containing bits or data blocks) may be temporarily cached in the node. Or, the entity may be another node or server which has stored the object for some period of time. In this embodiment, it is assumed that Node v is currently storing the object.

The identity of Node v may be determined based on, for example, information in a message sent from Node v to Node u during streaming to Node w or during storage of the object in Node v, or during the last transfer of the object from Node v to Node u. The message information may be stored in storage area 13 by controller 12 (e.g., second logic 15) to be accessed for identifying that the object is accessible from Node v when the request is received by Node u from Node r.

The identity of Node v may be determined, for example, as the node from which the transfer of the object incurs less (energy) cost among the several nodes known to Node u to be currently storing the object. In another embodiment, or in addition, Node u may not need to know the identity of Node v, but only the interface along which to forward the request. In this case, Node v will be implicitly determined as the first node that has the object stored on the path through the given interface.

In some networks, each node may store a given object for only a temporary period of time. In some cases, this time period may be very short, corresponding, for example, to the time required for Node v to transmit the object to another node (e.g., Node w) in the case where Node u received the request for the object from Node r while Node v was sending the requested object to Node w. To account for this situation, the identity of Node v may be determined based on additional information indicating a probability that the object will be stored in the first network entity for a certain time interval.

Based on this probability, the controller 12 of Node u may select Node v as the node from which the object is to be received or may select another node with a more likely probability that the object will be available within the time interval. The time interval may be a time between when consecutive requests for objects are received, an average time required for a node in the network to transmit an object, or another preset time. Node u may receive the message and probability information, and/or transfer cost information before the object is actually sent, along with the last transfer of the object or at another time.

Once the identity of Node v has been determined, the controller 12 of Node u may transmit a request message to Node v to receive the object. In response to this request message, the Node v may send the object to Node u at a rate, for example, on a packet-by-packet or block-by-block basis at a rate determined by current network conditions. (Block 330).

Once the object has been received in whole or part, the second logic 15 of the controller 12 of Node u makes a decision as to whether or not the object should be stored (e.g., cached) in storage area 13. (Block 340). This decision may be made based on one or more parameters as previously described. (In another embodiment, the operation in Block 330 may be performed during or before the operation in Block 340).

If the object is to be stored in storage area 13, then the second logic 15 or the third logic 16 may store the object in the storage area (Block 350) before, during, or after sending the object to Node r that requested the object. (Block 370). If the object is not to be stored in storage area 13, then controller 12 may transfer the object to Node r without storing the object in storage area 13. (See path 360).

Figure 4:
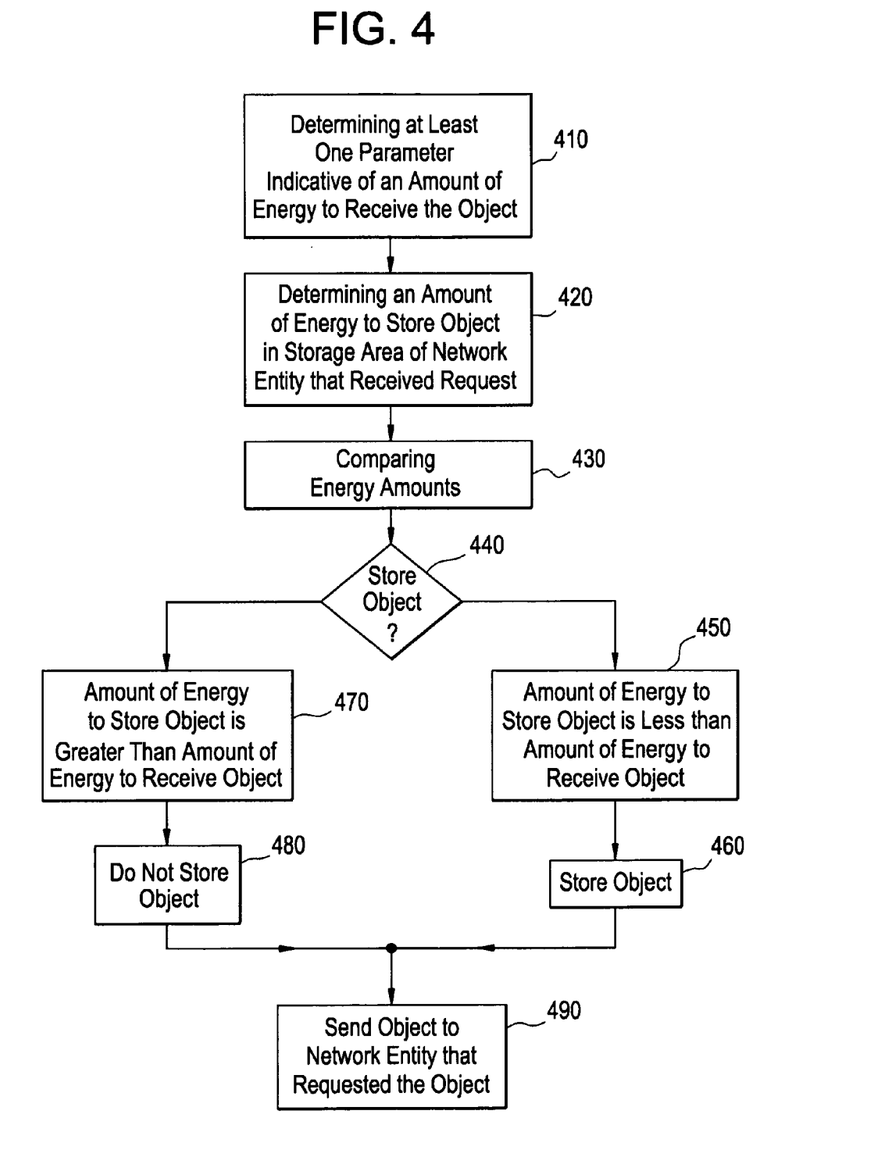
FIG. 4 shows a method for storing an object in a network entity.

FIG. 4 shows operations included in one embodiment of a method for making the decision in Block 340. The decision as to whether to store the object in Node u is determined based on consideration of one or more parameters. The parameters may be computed or otherwise determined from network conditions or other information in storage area 13. At least one of these parameters provides an indication of an amount of energy for receiving the object from Node v.

Thus, an initial operation of the method includes the second logic of controller 12 determining at least one parameter indicative of an amount of energy for Node u to receive the object from Node v. (Block 410). As a non-limiting example, Equations (2)-(4) of the Example Embodiment discussed below provides an indication of a rate at which requests may be received at a node.

Additionally, or alternatively, the amount of energy for Node u to receive the object from Node v may be the same or different from the amount of energy required for Node v to access or transmit the object to Node u.

The amount of energy for Node u to receive the object from Node v may be determined in a number of ways. For example, the energy amount may be determined based on at least a separation value between Nodes u and v. The separation value may correspond to or be based on a path length (e.g., the number of hops), a transport energy efficiency, a transport capacity, a load, a transfer time, and/or a transfer rate of the path between the nodes.

The number of network nodes (hops) between Nodes u and v, as well as the other aforementioned indicators of energy amount, may be determined based on information received by a network controller and/or information contained in a packet received from a network node including Node v or another node or contained in the actual object.

After the amount of energy to receive the object from Node v has been determined, a next operation includes determining an amount of energy to store the object in storage area 13 of Node u. (Block 420). In accordance with one embodiment, the amount of energy to store the object may be determined based on a difference between a first time when the object is received (in many instances this may be the current time) and a second time when a next request for the object is estimated to be received or is received.

Also, in accordance with at least one embodiment, the energy determination may take into consideration the operational cost of sending or receiving data on a per-bit or per object basis. For example, the amount of energy to store an object may be determined based on the storage equipment efficiency (e.g., in Watts/bit), the size of the object in bits and the time interval between the object arrival time (current time) and the arrival time of the next request for the object.

Alternatively, if the objects are fixed size packets the amount of energy to store an object may be determined by the storage equipment efficiency (in Watts/object) and the time interval the object is expected to be in the storage before the next request arrival time.

Once both energy amounts have been determined, a next operation includes comparing the amount of energy to store the object in the storage area of Node u and the amount of energy for Node u to receive the object from Node v. (Block 430). Based on this comparison, a determination is made as to whether the object will be stored. (Block 440).

In accordance with one embodiment, if the amount of energy to store the object for a time period is less than the amount of energy to receive the object (Block 450), then the object is stored in the storage area of Node u. (Block 460). The time period to store the object may be based on, for example, the time between the object arrival time (e.g., a current time or the same time the computation is being done) and the time at which the next request for the given object is expected to arrive.

Conversely, if the amount of energy to store the object for the time period is greater than the amount of energy to receive the object (Block 470), then the object is not stored in the storage area of Node u (Block 480). As a non-limiting example, Equations (5)-(12) of the Example Embodiment discussed below provides an indication of how the energy may be determined and used as a basis for determining whether an object is to be stored at Node u.

Once the decision to store (or not to store) the object has been made, the object is send through the network interface of Node u to the node that requested the object, namely Node r in the present example. (Block 490). Alternatively, the object may be sent to Node r before or during transfer of the object to the requesting node.

The method for managing network information may include a number of additional operations. For example, a number of operations may be included for updating information stored in the storage area of Node u. These operations may include storing information including a first list 510 of objects in storage area 13, a second list 520 of requests for objects received by the second network entity, and information 530 of one or more network conditions between the first and second network entities, as illustratively shown in FIG. 5. The first list, second list, and/or network information may then be updated by controller 12 when another request for the object is received, when a new object is received, or when conditions change, in order to allow for an accurate energy determination for determining whether to store future objects.

Figure 5:
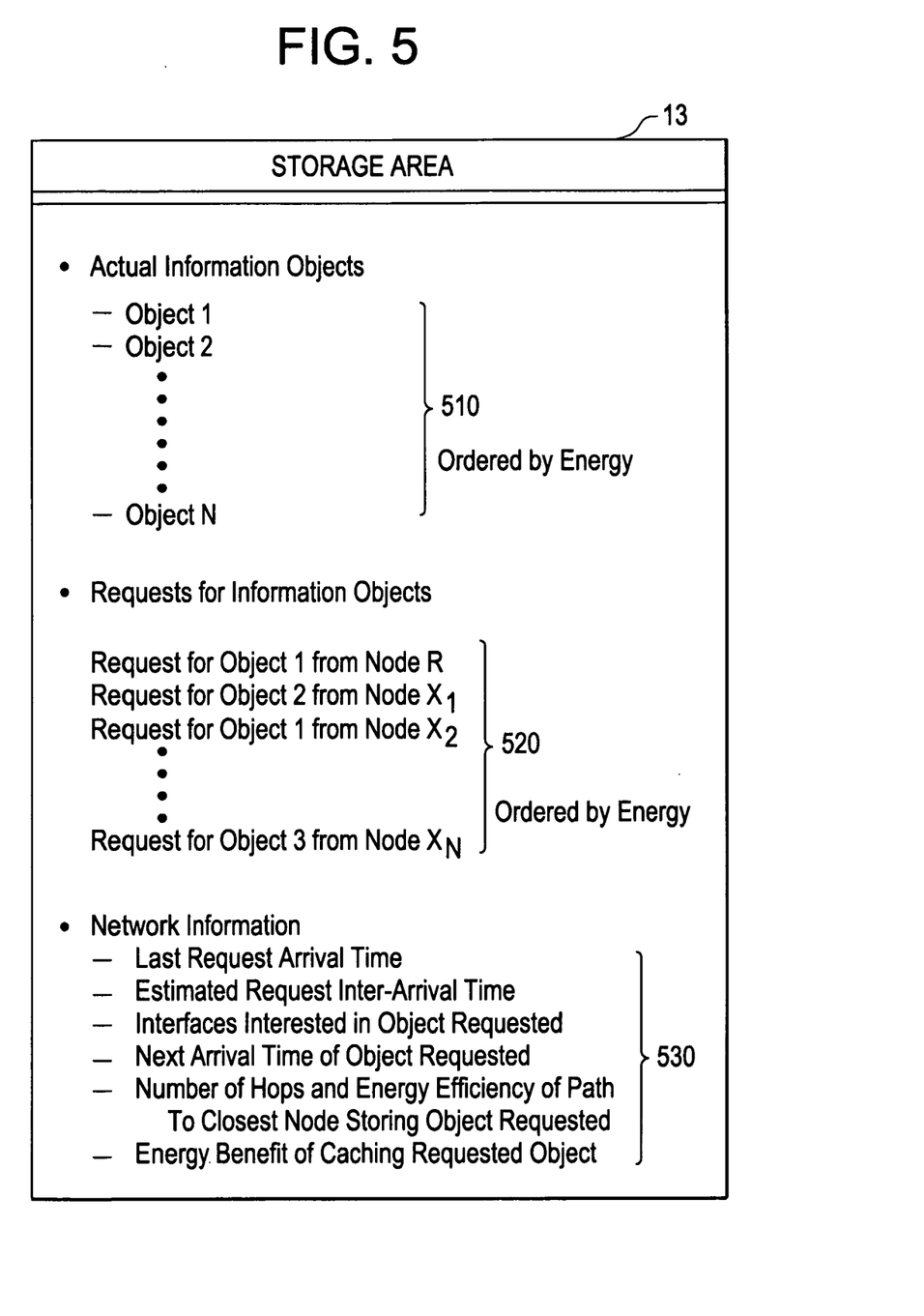
FIG. 5 shows an example of contents of the storage area.

The network condition information may be any the information previously indicated (e.g., transfer rate or time between the nodes) and/or the transfer rate may be updated based on a predictor (e.g., an estimated average transfer time or rate between the nodes).

A number of additional operations may be performed before the first network identity (e.g., node v) is identified as having access to a requested object. These operations may involve comparing relative energies of multiple nodes having access to the requested object and then making a selection of one of the nodes.

For example, the additional operations may include identifying a first network entity (e.g., node v) storing the requested object, determining a first amount of energy for node u to receive the object from node v, identifying another network entity (e.g., node w) storing the requested object, determining a second amount of energy for node u to receive the object from node w, and comparing the energies. Based on this comparison, controller 12 (e.g., first logic 14) may determine to receive the object from the node having the lesser amount of energy.

Example Embodiment

One embodiment of a method for managing network information may be described in more mathematical tennis as follows. Consider a time-slotted network $\mathcal{G}=(\mathcal{V},\varepsilon)$ with time-slot period $\Delta\tau$ in which nodes dynamically create and request content objects. At a network narrow waist (e.g, internet protocol (IP) layer in an IP network or an information-central network (ICN) layer in an ICN network), each content object is partitioned into equal-size chunks or elemental information objects of size b bits (in this example embodiment, "object" may refer to an elemental information object of size b bits). At time $t \in \mathcal{T}_k \subset Z^+$, each node $u \in \mathcal{V}$ hosts, as a repository, a set of information objects $\mathcal{K}_u(t) \in \mathcal{K}$ and requests, as a consumer, a set of information objects $\mathcal{Q}_u(t) \in \mathcal{K}$.

In order to meet request for ab object (e.g., from a user), information objects can be stored and transported over the network resources characterized by their capacity and energy efficiency. We define $c(t)=[c^{st}(t),c^{tr}(1)]$ as the network capacity vector, where $c_u^{st}(1)$ denotes the storage capacity of node u at time t in information objects of size b bits, and $c_{vu}^{tr}(t)$ the transport capacity of link (v,u) at time t in objects per resource-use (the resource-use period is equal to the network time-slot duration $\Delta r$), and $e(t)=[p^{st}(t),e^{tr}(t)]$ as the network energy efficiency vector, where $p_u^{st}(t)$ denotes the storage power efficiency of node u at time t (in Watts/object) and $e_{vu}^{tr}(t)$ the transport energy efficiency of link (v,u) at time t (in Joules/object).

We define $q(t) \in \{0,1\}^{|\mathcal{V}||\mathcal{K}|}$ as the request arrival process such that $q_{uk}(t)=1$ indicates that a request for object k arrives at node u at time t. We note that q(t) is a random process governed by the time evolution of the objects' popularity across network regions that can be modeled as a non-homogeneous Poisson process where the average rate at which requests for object k arrive at node u follows a Zipf-like distribution:

$$\lambda_{uk}(t) = \alpha_u(t) \frac{\pi_{uk}(t)^{-\beta_u(t)}}{\sum_{k=1}^{|\mathcal{K}|} \pi_{uk}(t)^{-\beta_u(t)}} \quad (1)$$

where $\alpha_u(t)$ denotes the total rate of requests of node u at time t, $\beta_u(t)$ is a Zipf shape parameter at node u at time t, and $\pi_{uk}(t)$ is the rank of object k at node u at time t.

In addition, we define $x(t)=[x^{st}(t),x^{tr}(t),r(t)]$ with $x^{st}(t) \in \{0,1\}^{|\mathcal{V}||\mathcal{K}|}$ and $x^{tr}(t) \in \{0,1\}^{|\mathcal{V}||\mathcal{K}|}$ as the network configuration at time t, where $x_{uk}^{st}(t)=1$ indicates that object k is being stored at node u at time t, $x_{vuk}^{tr}(t)=1$ indicates that object k is being transported by link (v,u) at time t.

The method may be applied to find an evolution of the network configuration x(t) that meets user requests q(t), satisfying network capacity c(t) with minimum total energy.

Because resource energy efficiencies and capacities are assumed to change at a much longer time scale than the caching/transport configuration, time dependence on the aforementioned quantitates as: $p_u^{st}$, $e_{vu}^{tr}$, $c_u^{st}$, and $c_{vu}^{tr}$ may be discarded. The total network energy consumption for the delivery of $\mathcal{K}$ over $\mathcal{G}$ during time $T=|\mathcal{T}_k|\Delta\tau$ can then be computed as:

$$E(x(t)) = \sum_{t \in \mathcal{T}} \left( \sum_{u \in \mathcal{V}} p_u^{st} r_u^{st}(t) \Delta\tau + \sum_{(v,u) \in \varepsilon} e_{vu}^{tr} r_{vu}^{tr}(t) \right) \quad (2)$$

$$r_u^{st}(t) = \sum_{k \in \mathcal{K}} x_{uk}^{st}(t) \quad (3)$$

$$r_{vu}^{tr}(t) = \sum_{k \in \mathcal{K}} x_{vuk}^{tr}(t) \quad (4)$$

where equation (2) assumes energy-load proportional resources, which approximate the more practical step-wise energy-load models where fixed energy components are switched on as load increases, equation (3) denotes the storage load of node u at time t, and equation (4) denotes the transport load of link (v,u) at time t.

Offline Solution

The energy efficient dynamic network configuration problem can be formulated as an ILP, as follows:

$$\min_{x(t)} \sum_{t \in \mathcal{T}} \left( \sum_{u \in \mathcal{V}} p_u^{st} r_u^{st}(t) \Delta \tau + \sum_{(v,u) \in \mathcal{E}} e_{vu}^{tr} r_{vu}^{tr}(t) \right) \quad (5)$$

s.t. $\forall u \in \mathcal{V}, k \in \mathcal{K}, t \in \mathcal{T}$ $$q_{uk}(t) \le x_{uk}^{st}(t) + \sum_{v \in \Theta(u)} \sum_{j=0}^{D_{uk}} x_{vuk}^{tr}(t+j), \quad (6)$$

$$x_{uk}^{st}(t) \le x_{uk}^{st}(t-1) + \sum_{v \in \Theta(u)} x_{vuk}^{tr}(t), \quad (7)$$

$$x_{vuk}^{tr}(t) \le x_{vk}^{st}(t-1) + \sum_{w \in \Theta(v)} x_{wvk}^{tr}(t), \quad (8)$$

$$x_{uk}^{st}(t) = 1, \forall k \in \mathcal{K}_u(t), x_{uk}^{st}(0) = 0, k \notin \mathcal{K}_u(t) \quad (9)$$

$$r_u^{st}(t) = \sum_{k \in \mathcal{K}} x_{uk}^{st}(t) \le c_u^{st} \quad (10)$$

$$r_{vu}^{tr}(t) = \sum_{k \in \mathcal{K}} x_{vuk}^{tr}(t) \le c_{vu}^{tr} \quad (11)$$

$$x_{uk}^{st}(t) \in \{0,1\}, x_{vuk}^{tr}(t) \in \{0,1\} \quad (12)$$

Here, equations (6), (7), and (8) may be referred to as the information-centric demand and flow conservation constraints. More specifically, equation (6) may assure that if object k is requested by node u at time t, then k either is in the cache of node u at time t or needs to be received by node u from a neighbor node v∈θ(u) within the interval [t,t+1, ..., t+$D_{uk}$], where $D_{uk}$ denotes the maximum time for the delivery of object k at node u.

Equation (7) may assure that if k is being cached at node u at time t, then k either was in the cache of u at time t−1 or is being received by node u from a neighbor node v∈θ(u) at time t.

Equation (8) may assure that if object k is being received by node to from a neighbor node v∈θ(u) at time t, then k either was in the cache of v at time t−1 or is being received by node v from a neighbor node w∈θ(v) at time t.

Equation (9) corresponds to initial condition constraints that may assure that each node u always stores the objects that it hosts as a repository, $\mathcal{K}_u(t)$, and at t=0 nothing else.

Equations (10) and (11) correspond to the storage and transport capacity constraints, and equation (12) indicates the binary nature of the network configuration variables.

Note that the solution to equation (5) essentially provides the combined routing and scheduling of information objects over the network transport and storage resources such that the combined transport+storage flows of information are conserved, and the demand is met with minimum overall energy cost. The energy efficient offline network configuration solution obtained by equation (5) may be referred to as EE-OFD, which may represent a lower bound on the minimum energy for the delivery of $\mathcal{K}$ over $\mathcal{G}$ during T according to q(t). This fundamental lower bound is achievable given the knowledge of q(t).

Partial knowledge of q(t) can be justified in several settings:

Scheduled services: live events, scheduled shows, and planned tele-conference/presence are examples of services that imply a priori knowledge of the time at which content objects will be requested.

Popularity prediction: several content objects' popularity can be predicted ahead of time and then refined as the objects are requested.

Chunk requests: when a content object is requested, the requests for all the chunks in the content object is implicitly known. In the case of file transfer, all chunks need to be delivered within the same delivery deadline; if it is a video file, chunks need to be delivered according to the streaming rate, etc.

Online Distributed Solution

Another example embodiment contemplates an online fully distributed algorithm (EE-OND) that allows nodes to make local caching decisions based on a current estimate of the global energy benefit. This solution is able to react to the dynamic arrival of object requests, for example, without requiring global knowledge of the request arrival process.

In an online setting, user requests can only be casually known; hence, low complexity distributed algorithms that adapt to changing user requests may be desirable. While EE-OFD provides routing and scheduling of information objects without the need of addressing the routing of object requests due to available global user request knowledge, an online solution may address the online redirection of object requests and online routing and scheduling of the actual information objects.

In this embodiment, a two-time scale system is implemented in which routing trees that determine upstream paths object requests travel towards their sources as well as the downstream paths information objects travel towards their destinations are updated every $\hat{T}$ time-slots. Thus, during a given time interval n∈$\mathcal{N}$ of duration $$\hat{T} = \frac{|\mathcal{T}|}{|\mathcal{N}|} \Delta \tau,$$

a request for object k at node u is forwarded to v=$\phi_k$(u) the upstream node of u in the routing forest $\mathcal{F}_k[n]=(\mathcal{V},\epsilon_k[n])$ formed by the collection of trees rooted at the (possibly multiple) sources of k during the given time interval n∈$\mathcal{N}$.

To promote energy efficiency, routing forests $\mathcal{F}_k[n], \forall k \in \mathcal{K}$, may be computed using shortest path routing with link weights given by their energy efficiency $e_{vu}^{tr}$. Also, nodes originally not repositories of a given object k may become temporal (or virtual) sources/repositories of k based on the time the object is expected to remain in the cache. More specifically, if a node knows it is highly likely not to evict k during the given time interval, it may announce to the network (e.g., through notification messages) that it will be a source for k for the given time interval.

Figure 6:
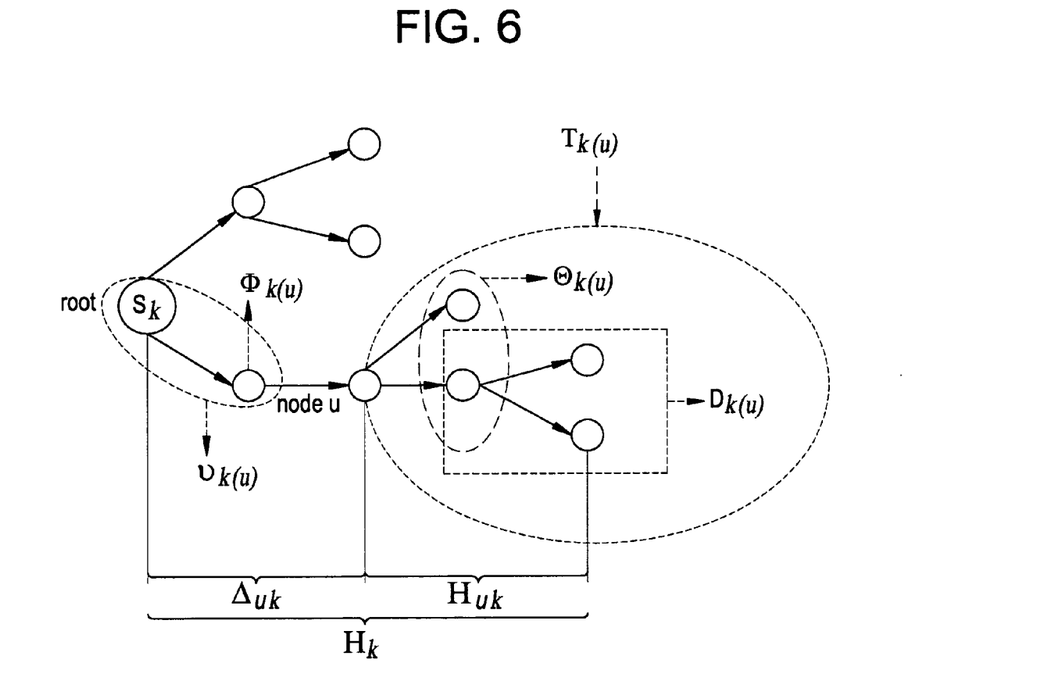
FIG. 6 shows a network node configuration corresponding to an embodiment for an online distributed method.

FIG. 6 shows an example of a routing tree for object k to which node u belongs to during time interval n. In order to address the design of an efficient online algorithm, the following observations may be made:

An object k requested at node u at time t, either was already cached at u, or needs to be delivered to u from the closest upstream node caching k.

A caching decision for object k at node u at time t is essentially a tradeoff between the energy needed to store k at u until the next k-request arrival, and the transport energy required to obtain k from the closest upstream node caching k at the time of the next k-request arrival.

In FIG. 6, the distribution tree for object k to which node u belongs to during time interval n may be represented as $\mathcal{T}_k[n] \subseteq \mathcal{F}_k[n] \subseteq \mathcal{G}$. Based on these observations, at any given time t, letting $t_{uk}^q$ denote the last k-request arrival time, and $t_{uk}^o$ the next k-object arrival time, the energy benefit of caching object k at node u at time t may be evaluated as the difference between the transport energy needed to deliver object k to node u based on the current network conditions and the storage energy needed to store k at node u during the interval $[t_{uk}^o, t_{uk}^q + \hat{\Delta}t_{uk}]$, where $\hat{\Delta}t_{uk}$ denotes the current estimate of the inter-arrival time of requests for object k at node u.

More specifically, in mathematical terms:

$$EB_{uk}(t) = e_{uk}^{tr}(t) - p_u^{st}\hat{\Delta}t_{uk}^{st}(t) \quad (13)$$

$$e_{uk}^{tr}(t) = \sum_{(v,u)\in\Gamma_{uk}(t)} e_{vu}^{tr} \quad (14)$$

$$\hat{\Delta}t_{uk}^{st}(t) = t_{uk}^q + \hat{\Delta}t_{uk}(t) - t_{uk}^o \quad (15)$$

where equation (14) denotes the energy efficiency in Joules/object of the path from u to the closest upstream node caching k at time t, $\Gamma_{uk}(t)$, and equation (15) denotes the storage energy needed to store k from the next k-object arrival time, $t_{uk}^o$, to the estimated next k-request arrival time $t_{uk}^q + \hat{\Delta}t_{uk}$.

An example of an algorithm, in pseudocode form, for implementing the EEOFD embodiment may be given as follows:

```
For every node u∈V, v = φₖ(u)
If Request for object k at node u (time t )
    If Object k not in the cache
        Compute t̂_uk^q(t) = t + Δ̂t_uk(t)
        Compute t_uk^o(t) = t + h_uk(t)Δτ
        Compute e_uk^tr(t)
        Compute EB_uk(t)
        Update/insert request in the cache based on EB_uk(t)
        (decreasing order)
        If Cache full, Remove last request entry (least energy benefit)
        Forward request upstream
    Else
        Forward k downstream (h_uk(t) = e_uk^tr(t) = 0)
        Update t̂_uk^q(t) = t + Δ̂t_uk(t)
        Update t_uk^o(t) = t
        Update e_uk^tr(t)
        Update EB_uk(t)
        If (EB_uk(t) ≥ 0) or (ρ̂_vu(t̂_uk^q(t)) + 1 ≥ c_vu^tr),
            Keep k in the cache and update its position based on
            EB_uk(t) (decreasing order)
        Else
            Remove k from the cache
If Object k at node it from v = φₖ(u) (time t)
    Update h_uk(t) = h_vk(t) + 1
    Update e_uk^tr(t) = e_vk^tr(t) + e_vu^tr
    Get t̂_uk^q(t) from cache entry
    Update t_uk^o(t) = t
    Update EB_uk(t)
    If (EB_uk(t) ≥ 0) or (ρ̂_vu(t̂_uk^q(t)) + 1 ≥ c_vu^tr)
        Cache k based on EB_uk (decreasing order)
        Set h_uk(t) = 0 , e_uk^tr(t) = 0
        If Cache full, Remove last object l (least energy benefit)
        whose removal does not violate capacity constraint on
        link (φ_l(u),u) at time t̂_ul^q(t)
    Forward k downstream, including h_uk(t) and e_uk^tr(t)
```

In EE-OND, nodes cache information objects according the their energy benefit. Specifically, every node $u \in \mathcal{V}$ maintains a list of entries in its cache that include actual information objects as well as requests for information objects, in decreasing order of energy benefit. A given information object k can be present in the cache of node u as a request or as an object, along with the following parameters:

1. Last request arrival time, $t_{uk}^q$
2. Estimated request inter-arrival time $\hat{\Delta}t_{uk}(t)$
3. Interfaces interested in k, $\theta_k^q(u)$
4. Next object arrival time, $t_{uk}^o$
5. Number of hops and energy efficiency of the path to the closest upstream node caching k, $h_{uk}(t)$ and $e_{uk}^{tr}(t)$
6. Energy benefit of caching k, $EB_{uk}(t)$ In this embodiment, the packet that carries information object k may include information indicative of 1) the data object of size b bits and 2) the number of hops and energy efficiency of the path until the closest upstream node caching k. Every time node u receives a new request for object k, the estimated request inter-arrival time, $\hat{\Delta}t_{uk}(t)$, may be updated based on a predictor. One approach is to adopt the estimated average inter-arrival time as a predictor. The next k-object arrival time is computed based on the number of hops to the closest node caching k as $t_{uk}^o(t) = h_{uk}(t)\Delta\tau$.

Furthermore, node u can decide to cache object k in order to avoid violating the capacity constraint on the incoming link $(\phi_k(u), u)$. We denote with $\hat{\rho}_{\phi_k(u)u}(t)$ the estimated load on link $(\phi_k(u), u)$ at time t.

In this embodiment, an online fully distributed algorithm is provided where each node $u \in \mathcal{V}$ computes $EB_{uk}(t)$ locally upon 1) a new request arrival, and/or 2) a new object arrival. This embodiment may have constant-time complexity and may use only locally available information. The information about $x^{st}(t)$ needed to update $h_{uk}(t)$ and $e_{uk}^{tr}(t)$ may be obtained, for example, from $v = \phi_k(u)$, which sends $h_{vk}(t)$ and $e_{vk}^{tr}(t)$ with the packet carrying object k, and the information about $x^{st}(t)$ needed to update $\hat{\Delta}t_{uk}^{st}(t)$ is obtained from the user requests arriving at node u.

In accordance with another embodiment, a non-transitory computer-readable medium stores instructions for managing information in a network. These instructions include code for instructing at least one processor or other circuit to perform the operations of any of the aforementioned method embodiments.

For example, one medium may store instructions including first code to identify a first network entity having an object, second code to receive the object from the first network entity, and third code to store the object in a storage area based on a parameter. The storage area may be coupled to a second network entity which received a request for the object and the object from the first network entity, and the parameter may be indicative of an amount of energy for the second network entity to receive the object from the first network entity. Also, concerning the foregoing embodiments, the term logic may refer to hardware, software, or a combination of both.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

We claim:

1. A method for managing information in a network, comprising:
   receiving, by a first network entity, a request for an object;
   identifying, by the first network entity, a second network entity storing the object;
   receiving, by the first network entity, the object from the second network entity; and
   storing, by the first network entity, the object in a storage area based on a parameter, the parameter indicative of an amount of energy for the first network entity to receive the object from the second network entity.

2. The method of claim 1, wherein the second network entity is different from a user terminal.

3. The method of claim 1, wherein the identifying identifies the second network entity based on first information indicating that the second network entity is storing the object and second information indicating a probability that the object will be stored in the second network entity for a time interval.

4. The method of claim 3, further comprising:
receiving, by the first network entity, the first and second information from the second network entity before the first network entity receives the object from the second network entity.

5. The method of claim 1, wherein the amount of energy for the first network entity to receive the object from the second network entity is based on at least a separation value between the first network entity and the second network entity.

6. The method of claim 5, wherein the separation value is based on at least one of a path length between the first and second network entities, a transfer time or rate between the first and second network entities, or a number of network nodes between the first and second network entities.

7. The method of claim 5, further comprising:
receiving information indicative of the number of network nodes between the first and second network entities in a packet containing data corresponding to the object received from the second network entity.

8. The method of claim 5, wherein the amount of energy for the first network entity to receive the object from the second network entity is based on another value indicative of at least one of:
a transfer rate of the object received from the second network entity,
a transport energy efficiency of a network path between the first network entity and the second network entity,
a transport capacity of the network path between the first network entity and the second network entity, or
a load of the network path between the first network entity and the second network entity.

9. The method of claim 1, wherein the storing includes:
determining an amount of energy to store the object in the storage area,
comparing the amount of energy to store the object in the storage area and the amount of energy for the first network entity to receive the object from the second network entity, and
storing the object in the storage area based on the comparison.

10. The method of claim 9, wherein the object is stored in the storage area when the amount of energy to store the object in the storage area for a time period is less than the amount of energy for the first network entity to receive the object from the second network entity.

11. The method of claim 9, wherein the object is not stored in the storage area when the amount of energy to store the object in the storage area for a time period is greater than the amount of energy for the first network entity to receive the object from the second network entity.

12. The method of claim 1, further comprising:
storing information including a first list of objects in the storage area and a second list of requests for objects received by the first network entity, and information of a network condition between the first and second network entities, and
updating at least one of the first list, the second list, or the network condition information when another request for the object is received, wherein said information is stored in an area accessible by the first network entity.

13. The method of claim 1, wherein the identifying includes:
determining a first amount of energy for the first network entity to receive the object from the second network entity;
determining a second amount of energy for the first network entity to receive the object from a third network entity;
comparing the first amount of energy to the second amount of energy; and
determining to receive the object from the second network entity based on the comparison.

14. The method of claim 13, wherein:
the first amount of energy is determined based on a first separation value between the first network entity and the second network entity, and
the second amount of energy is determined based on a second separation value between the second network entity and a third network entity.

15. The method of claim 14, wherein
the first separation value is based on at least one of a path length between the first and second network entities or a transit time between the first and second network entities, and
the second separation value is based on at least one of a path length between the second and third network entities or a transit time between the second and third network entities.

16. An apparatus comprising:
first logic to identify a first network entity having an object;
an interface to receive the object from the first network entity; and
second logic to store the object in a storage area based on a parameter, wherein the storage area is coupled to a second network entity and the parameter is indicative of an amount of energy for the second network entity to receive the object from the first network entity.

17. The apparatus of claim 16, wherein the amount of energy for the second entity to receive the object from the first network entity is based on at least one of:
a path length between the first and second network entities,
a transfer time or rate between the first and second network entities,
a transport energy efficiency of a network path between the first network entity and the second network entity,
a transport capacity of the network path between the first network entity and the second network entity,
a load of the network path between the first network entity and the second network entity.

18. The apparatus of claim 16, wherein the second logic is to:
determine an amount of energy to store the object in the storage area,
compare the amount of energy to store the object in the storage area and the amount of energy for the second network entity to receive the object from the first network entity, and
store the object in the storage area based on the comparison.

19. The apparatus of claim 18, wherein the second logic stores the object in the storage area when the amount of energy to store the object in the storage area for a time period is less than the amount of energy for the second entity to receive the object from the first network entity.

20. The apparatus of claim 18, wherein the second logic does not store the object in the storage area when the amount of energy to store the object in the storage area for a time period is greater than the amount of energy for the second entity to receive the object from the first network entity.

* * * * *